United States Patent [19]

Röhm

[11] Patent Number: 4,771,933
[45] Date of Patent: Sep. 20, 1988

[54] THREE-JAW CHUCK FOR A LATHE

[76] Inventor: Günter H. Röhm, Heinrich-Röm-Str. 50, D-7927 Sontheim, Fed. Rep. of Germany

[21] Appl. No.: 68,832

[22] Filed: Jun. 30, 1987

[30] Foreign Application Priority Data

Jul. 4, 1986 [DE] Fed. Rep. of Germany ....... 3622453

[51] Int. Cl.$^4$ .......................... B23B 5/22; B23B 31/14
[52] U.S. Cl. .......................................... 279/1 C; 279/6; 279/110
[58] Field of Search ................... 279/1 C, 6, 1 SJ, 110, 279/121; 82/40 A, DIG. 6

[56] References Cited

U.S. PATENT DOCUMENTS

| 1,817,721 | 8/1931 | Van Hamersveld | 279/110 X |
| 2,950,117 | 8/1960 | Walmsley | 279/1 SJ |
| 4,521,028 | 6/1985 | Hiestand | 279/121 X |
| 4,669,741 | 6/1987 | Röhm | 279/1 C |

FOREIGN PATENT DOCUMENTS 71011 4/1983 Japan ................................. 82/40 A Primary Examiner—Gil Weidenfeld
Assistant Examiner—Steven C. Bishop
Attorney, Agent, or Firm—Herbert Dubno

[57] ABSTRACT

The chuck clamps a workpiece on a clamping axis eccentric to the rotation axis of the chuck. The spacing between the rotation axis and the clamping axis parallel to it can be varied along a radial axis spacing line going through the rotation axis. One jaw has a clamping surface which intersects the axis spacing plane going through the rotation axis on the axis spacing line perpendicular to the axis spacing line and is adjustable along the axis spacing line. The other jaws opposite this one jaw are adjustably mounted in guides inclined symmetrically about the axis spacing plane and are jointly centrally drivable. The first jaw and both other jaws are adjustable independently of each other. Each of the other jaws has a planar clamping surface perpendicular to its guide direction. The first jaw which does not participate in the clamping process exists to change the axis spacing. It is formed as a revolving disk which is rotatably mounted in the chuck body with the revolving disk axis parallel to the rotation axis, is drivable stepwise in the rotation direction and can be fixed in a plurality of different rotary positions. A plurality of clamping surfaces are located at several places along the circumference of the revolving disk with radial spacing from the revolving disk axis. These clamping surfaces are correlated with the allowed rotary positions of the revolving disk so that one of the clamping surfaces can be positioned opposite the jaws guided in the inclined guides in each rotary position.

10 Claims, 6 Drawing Sheets

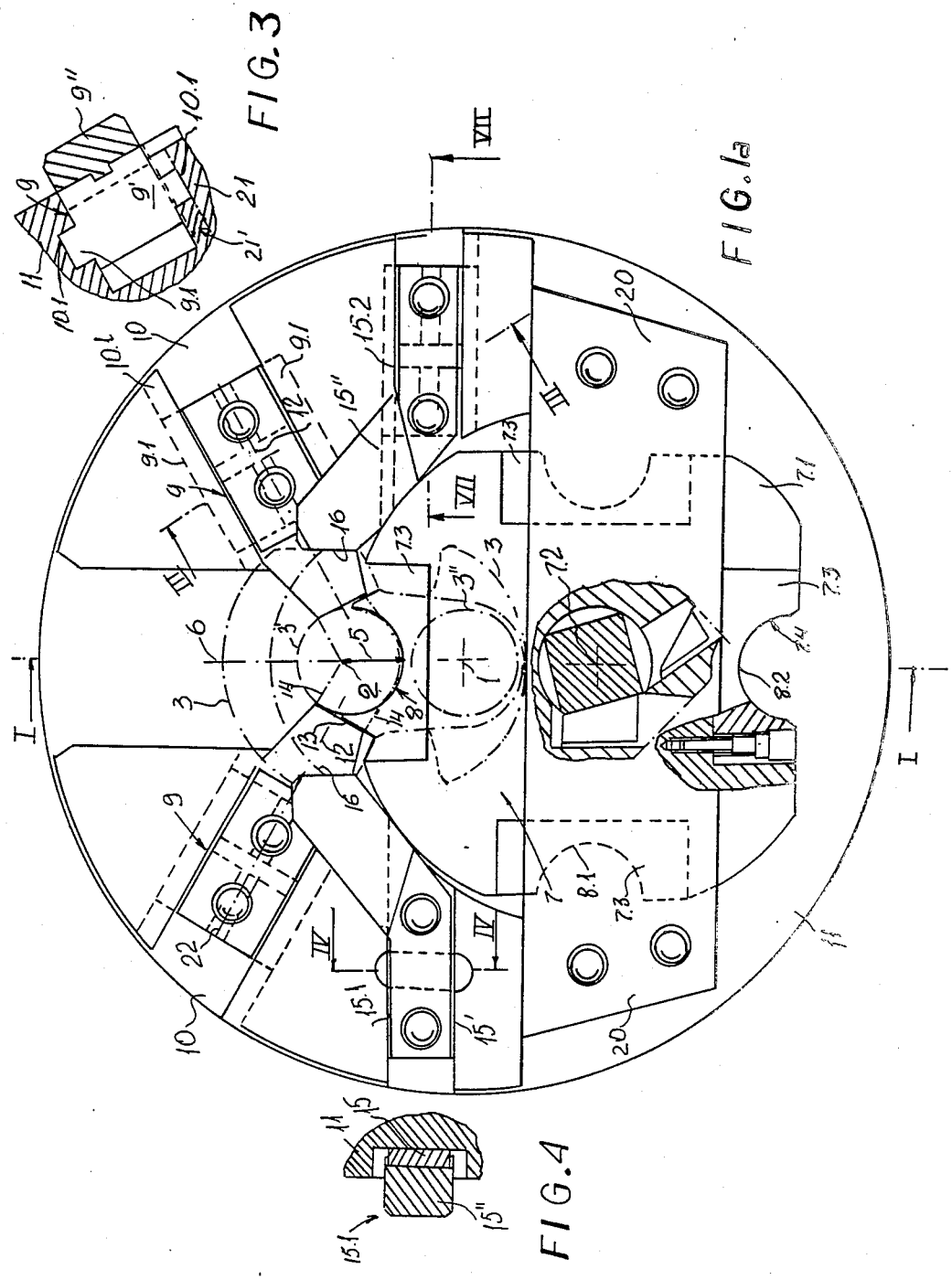

THREE-JAW CHUCK FOR A LATHE

CROSS REFERENCE TO RELATED APPLICATION

This application is related to my copending application Ser. No. 811,101, filed Dec. 19, 1985, now U.S. Pat. No. 4,669,741.

FIELD OF THE INVENTION

My invention relates to a three-jaw chuck for a lathe and, more particularly, to a three-jaw chuck for a lathe which clamps a workpiece on a clamping axis, especially a three-jaw chuck which clamps a crankshaft on a clamping axis which is eccentric, i.e. offset from the rotation axis of the chuck.

BACKGROUND OF THE INVENTION

A three-jaw chuck for a lathe can be used for clamping a workpiece, particularly a crankshaft, on a clamping axis eccentric to the rotation axis of the clamping chuck.

It comprises a device for changing the spacing between the rotation axis and the clamping axis parallel thereto inside an axis spacing area along an axis spacing line extending radially through the rotation axis.

One of the clamping jaws with its clamping surface intersects the axis spacing plane going through the rotation axis on the axis spacing line and is adjustable so that the position of the clamping surface on the axis spacing line varies. The other clamp jaws are positioned on each side of the axis spacing plane slidably and adjustably in guides inclined symmetrically about the axis spacing plane and are jointly drivable.

This chuck allows crankshafts with substantially the same clamping diameter, but different crank strokes, to be machined by a lathe by changing the spacing between the rotation axis and the clamping axis.

A fit to another clamping diameter is also possible by replacing seat members in the clamp jaws.

To make this change of axis spacing, one known chuck has an axial chuck base attachable to the lathe spindle and a clamping head in whose clamp head body guided on the chuck base axially slidable on the axial spacing line all three clamp jaws are guided radially and slidably with respect to the clamping axis.

These clamp jaws are jointly slidable, e.g. by axially movable key rods driven by a drive piston slidable axially in the chuck base. They are jointly drivable centrally toward the clamping axis. Counterweights slidable toward the clamping head running oppositely provide a compensation for any unbalance occuring.

The chuck base, in principle, can be a chuck flange allowing connection to the lathe spindle in which the clamping head is guided axially slidable and is securable in its guide so that it is forced by a spacing piece determining its position by an adjusting spindle against the chuck base.

The clamp jaws and the key rods can be guided in the clamping head and can axially lock together. The key rods slidable in the adjusting direction are connected to one of them with the drive piston and are connected to clamping plates attached to the drive piston.

In the clamping head a workpiece opening, aligning the workpiece before clamping, can be provided with an aligning jaw pair whose movable aligning jaw likewise is guided in the clamping head.

Its own axially movable key rod operates this aligning jaw which, like the key rod for the clamp jaws, is slidably connected to a second clamping plate which is rigidly attached to a second drive piston provided to drive only the aligning jaw which is guided coaxial to the drive piston for the clamp jaws and in the latter toward the rotation axis of the chuck base.

As a result the clamping head up to the clamping plate and the drive piston forms a complete jaw chuck which is adjustable according to the crank stroke of the workpiece in the chuck base.

The counterweights for correcting imbalance are guided slidably in the clamping head. They act moreover to compensate as much as possible for the imbalance arising by sliding the clamping head in the chuck base. They slide in the clamping head opposite to its own sliding direction and are clamped in position by a spindle by a fitting spacing piece against the clamping head. Disadvantageously in such a clamping chuck the mass of the slidable clamping head is comparatively large so that the mass of the counterweights must be large to the same extent to compensate.

Also some residual imbalance always remains; such imbalance must be borne by the lathe spindle which must be made correspondingly large and requires massive and expensive spindle bearings.

The adjustment of the clamping head and the counterweights are problematical and expensive since these adjustments require their own working process. Moreover the clamping occuring after adjustment requires an additional working process to secure the adjustment which often does not remain without the adjustment reverting.

These disadvantages are reduced in chuck described in German Open Application (DE-OS) No. 34 46 687 in which the clamping head body is a slider slidable on the axis spacing line whose width transverse to the sliding direction is smaller than the diameter of the chuck base.

The counterweights guided and positioned in the chuck base on both sides of the clamping head body sliding opposite to the clamping head body for balancing are connected with each drive.

Both clamping jaws positioned inclined symmetrically relative to the axis spacing plane having a sliding direction opposite to the the clamping head body are divided into an inner jaw member and an outer jaw member. The inner jaw member in the clamping head body and the outer jaw member with the key rod engaged in it are guided in the chuck base and both jaw members are engaged with each other in a linear guide running parallel to the sliding direction of the clamping head body locked together by an undercut.

The clamp jaw slidable on the axial spacing line is formed in one piece without separation into inner and outer clamping members and is guided with only its key rods in the clamping head body. The key rod driving it is connected axially locked, but slidable in the sliding direction of the clamping head body to one of the key rods for the other clamp jaws is suspended with its clamping plate connected with its drive piston.

Also each of the aligning jaws drivable and slidable transverse to the axis spacing plane is separated into an inner jaw member guided inside the clamping head body and into an outer jaw member which is guided with its key rod and a drive piston operating the aligning jaws and which is engaged with the inner jaw member in a linear guide running parallel to the sliding direction of the clamping head body and locked in position by an undercut.

As a result no pieces of the clamping head forming the outer clamp jaws and the key rod belonging to it take part in this sliding and thus these elements do not contribute to the changes in the imbalance.

Outer and inner jaw members are coupled to each other but locked together in the sliding direction of the clamp jaws, e.g. dovetailed or in a T-groove guide, slidable in the linear guide connecting it with the clamping head so that the inner jaw member must participate in each sliding motion of the outer jaw member independently of the adjustment of the clamping head in the chuck base.

Thus the clamping head body containing only the adjustable clamping jaws adjustable in the axial spacing direction and the inner jaw member are formed so as to be small and light.

The counterweights for the imbalance which are correspondingly smaller and lighter in weight are located on both sides adjacent the clamping head body and can be guided and located in the chuck base. As a consequence, a light, compact, space saving structure results. Moreover this allows direct drive of the clamping head body with the counterweights so that the latter are adjusted automatically on changing the clamping head adjustment and thus automatically cause the compensation. On the other hand the chuck is complex and expensive.

OBJECTS OF THE INVENTION

It is an object of my invention to provide a three-jaw chuck for a lathe which improves upon the chuck of this earlier application.

It is also an object of my invention to provide an improved three-jaw chuck for a lathe which has the simplest possible structure but is easily and quickly adjustable.

It is another object of my invention to provide an improved three-jaw chuck for a lathe in which only the lightest and fewest pieces are movable while adjusting it so that the imbalance and the counterweights acting to provide compensation for it are small.

SUMMARY OF THE INVENTION

These objects and others which will become more readily apparent hereinafter are attained in accordance with my invention in a three-jaw chuck for a lathe for clamping a workpiece, particularly a crankshaft, on a clamping axis offset from to the rotation axis of the chuck comprising a device for changing the spacing between the rotation axis and the clamping axis parallel thereto inside an axis spacing area along an axis spacing line extending radially through the rotation axis.

One of the clamping jaws with at least one clamping surface intersects the axis spacing plane going through the rotation axis on the axis spacing line and is adjustable so that the position of the clamping surface on the axis spacing line varies.

The other clamp jaws are positioned slidably and adjustably on each side of the axis spacing plane in guides inclined symmetrically about the axis spacing plane and are jointly drivable.

According to my invention the clamp jaw intersecting the axis spacing line with its clamping surface and both of the other two jointly drivable clamp jaws are adjustable independently of each other in and/or on the chuck body which is rigidly mounted on the rotating spindle of the lathe so that each of the other jointly drivable clamp jaws has a planar clamping surface perpendicular to its guide direction and the projection of the axis spacing area perpendicular to the plane of the planar clamping surfaces on one of the clamping surfaces is positioned on at least one plane intersecting the clamping surface on each of the other jointly drivable clamp jaws perpendicular to the rotation axis.

In the chuck according to my invention the previously used components in the chuck base and the clamping head slidable opposite it are eliminated. All three clamp jaws are located in a central chuck body which is attached rigidly unslidably on the rotating spindle. To change the axial spacing the clamp jaw intersecting the axis spacing line with its clamping surface or surfaces is moved in the chuck body. Thus the associated imbalance is so slight that only small counterweights with a small displacement are required. The counterweights are also accomodated without difficulty in the chuck body and can be coupled with the adjusting motion of the clamp jaws to permit an automatic compensation of any imbalance. On clamping the workpiece against it this clamp jaw remains fixed.

The clamping process proceeds by adjusting only the jointly driven clamp jaws positioned symmetric to the axis spacing plane which press the workpiece centrally against the clamping surface of the third clamp jaw intersecting the axis spacing plane which thus acts as the only fixed bearing surface.

Because of the arrangement and structure of the clamping surface of both other jointly driven clamp jaws it is guaranteed that at each position of the clamping axis inside of the axis spacing area the clamping surfaces contact tangentially on the workpiece circumference and the clamping force acts radially to the clamping axis of the workpiece.

With small axial spacing the contact of the workpiece occurs only near, in larger axis spacing further out, on the clamping surfaces as seen from the third clamp jaw fixed in the clamping process.

Two adjustable aligning jaws opposite each other perpendicular to the axis spacing plane in the chuck body align the workpiece before the clamping process. One of these aligning jaws is drivable. Both aligning jaws have an aligning surface parallel to the axial spacing plane which extends itself on the axis spacing line at least over the length of the axis spacing area. This ensures that their aligning surfaces come into contact with the workpiece at each location on the clamping axis inside of the axis spacing area for the workpiece.

Advantageously the clamp jaw intersecting the axis spacing plane is a revolving disk which has a plurality of clamping surfaces and which is rotatably mounted with its revolving disk axis parallel to the rotation axis in the chuck body, is drivable stepwise in the rotation direction and can be held fixed in any of a plurality of rotary positions so that its clamping surfaces are spaced from the revolving disk axis with different radial spacing at several positions along the circumference of the revolving disk.

Thus each of these clamping surfaces is associated with a different rotary position on the revolving disk. Hence one of the clamping surfaces intersects the axis spacing plane in each rotary position.

For changing the axis spacing it is only necessary to bring the revolving disk in that rotary position in which the clamping surface associated with this rotary position in the revolving disk results in the desired position of the clamping axis for the workpiece.

Appropriately each of the clamping surfaces can be on an inset in the revolving disk. By exchange of the insets it is not difficult to provide not only additional axis spacings but also other clamping diameters. In particular the clamping surface and/or the clamping surfaces on the revolving disk can be on cylindrical shells, particularly cylindrical half shells, and are formed with their cylinder axes coaxial to the clamping axis in the clamping position. The radius of the cylindrical shells can fit the clamping diameter of the workpiece so that the workpiece essentially is locked into a recess in the cylindrical shell.

According to a further feature of my invention a counterweight acting to compensate for imbalance is adjustable by rotating the revolving disk itself. The driving of the counterweight occurs also by rotating the revolving disk.

Appropriately the revolving disk can have a journal coaxial to the revolving disk axis which drives the counterweight guided slidably on the axis spacing line in the chuck body over a controlling curve.

The counterweight can also be fixed in a plurality of positions corresponding to the different rotary positions of the revolving disk in the chuck body so that undesirable position changes of the counterweight are avoided during running of the chuck. The revolving disk itself is advantageously supported on both sides and the front side is provided with a supporting arm overlapping the revolving disk on the chuck body.

The guides of both jointly driven chuck jaws are appropriately linear guides whose central axes runs in the guide direction intersecting in the axis spacing plane in the center of the axis spacing area. Then on changing the axial spacing from smallest to largest the corresponding displacement of the workpiece contacting the clamping surface toward the central axis of the clamp jaw guide is limited to at maximum half the axis spacing area.

BRIEF DESCRIPTION OF THE DRAWING

The above and other objects, features and advantages of my invention will become more readily apparent from the following description, reference being made to the accompanying highly diagrammatic drawing in which:

FIG. 1 is an axial cross sectional view through a power operated three-jaw chuck according to my invention taken along the section line I—I of FIG. 1a;

FIG. 1a is a partially cutaway front view of the chuck according to FIG. 1 as seen in the direction of the arrow Ia in FIG. 1;

FIG. 3 is a cross sectional view taken along the section line III—III of FIG. 1a;

FIG. 4 is a cross sectional view taken along the section line IV—IV of FIG. 1a;

FIG. 7 is a cross sectional view taken along the section line VII—VII in FIG. 1a.

SPECIFIC DESCRIPTION

Figure 1:
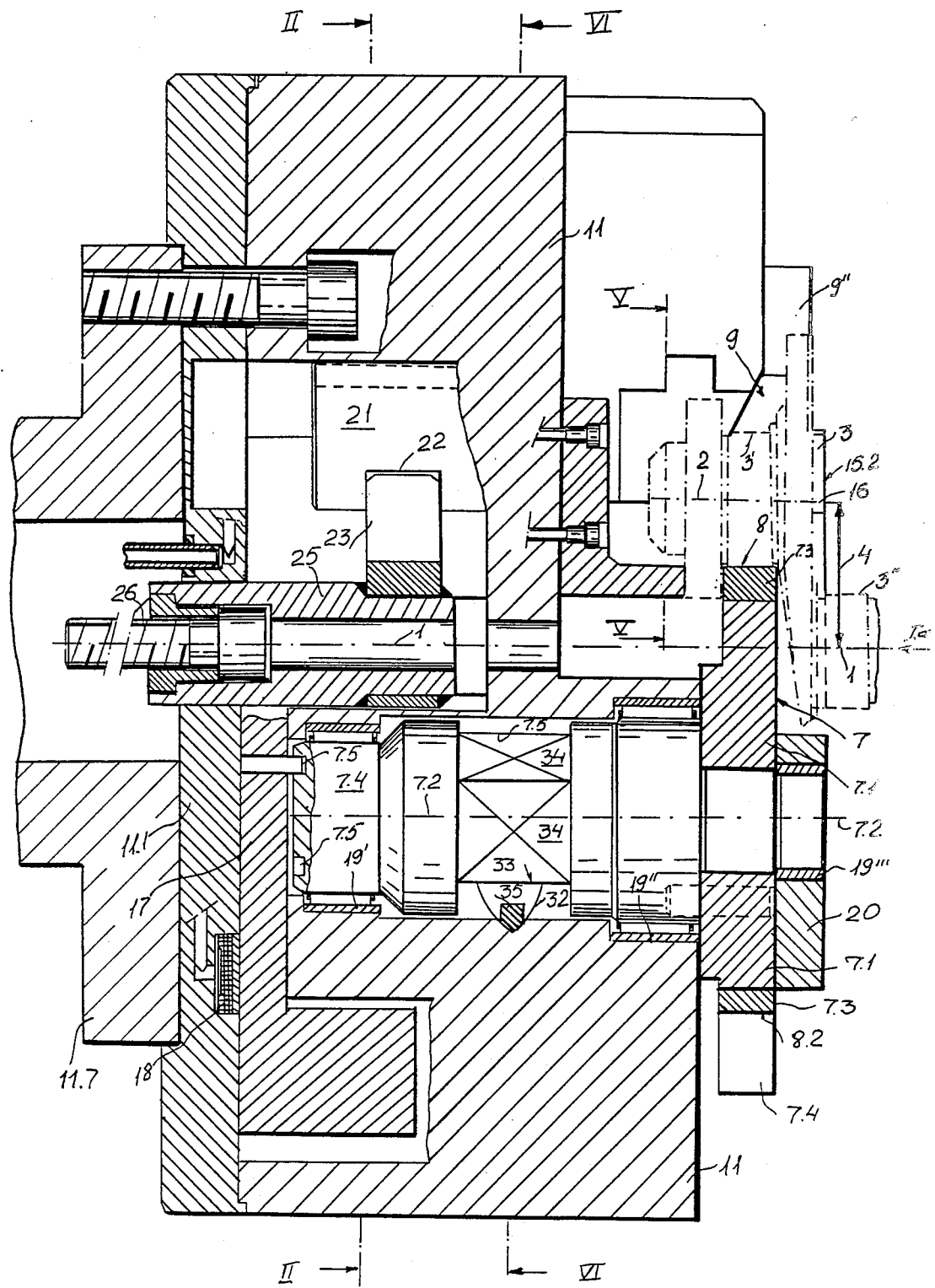

The chuck shown in the drawing clamps a crankshaft on an eccentric chuck axis 2 offset from to the rotation axis 1 of the chuck. The crankshaft is indicated by the dot-dashed lines in FIGS. 1 and 1a.

The crankshaft is clamped in the chuck on the shaft region 3' whose axis is coincident with the chuck axis 2. The crankshaft 3 should be machined in the shaft region 3''. The axis of this shaft region 3'' also coincides with the rotation axis 1.

To be able to machine crankshafts with different crank strokes, but equal clamping diameters, the axial spacing 4 between the rotation axis 1 and the chuck axis 2 parallel to it along a radius of the chuck indicated by the double arrow 5, in FIG. 1a along the axis spacing line 6—6, is variable. This allows one clamp jaw 7 to have at least one clamping surface 8 which intersects the axis spacing plane going through the rotation axis 1 with the axis spacing line 6—6 in it (the plane of the drawing in FIG. 1, but perpendicular to the drawing plane in FIG. 1a) perpendicular to the axis spacing line 6—6.

The clamp jaw 7 is moreover adjustable as described below so that the position of the clamping surface 8 on the axis spacing line 6—6 corresponds to the desired clamping axis position.

Both other clamp jaws 9 opposing this clamp jaw 7 are positioned on opposite sides of the axis spacing plane in guides 10 symmetrically about the axis spacing plane and are drivable as it were for central clamping.

The clamp jaw 7 intersecting the axis spacing plane with its clamping surface 8 and both centrally drivable clamp jaws 9 are adjustable independently of each other in and/or on a chuck body 11. This chuck body 11 is for its part attached with a chuck flange 11.1 in the usual way on the head of the rotating spindle 11.7 of the lathe.

Both centrally jointly drivable clamp jaws 9 have on their face a planar clamping surface 13 perpendicular to the guide direction 12—12 of these clamp jaws 9.

The projection of the axis spacing area perpendicular to the plane of one of the clamping surfaces 13 on the clamping surface 13 is positioned in at least one plane coincident with the drawing plane in FIG. 1a intersecting these clamping surfaces 13 and perpendicular to the rotation axis 1 in each of the jointly driven clamp jaws 9. This projection is indicated in FIG. 1a by the dot-dashed lines 14.

Two adjustable aligning jaws 15.1 and 15.2 are positioned opposite each other perpendicular to the axis spacing line 6—6 in the chuck body 11 of which the right aligning jaw is drivable in FIG. 1a. Both aligning jaws 15.1 and 15.2 have aligning surfaces parallel to the axis spacing plane which extend at least over the axis spacing area 5 on the the axis spacing line 6—6 and also have a length which is at least equal to the length of this axis spacing area 5.

The clamp jaw 7 comprises a revolving disk 7.1 which is rotatably mounted on the chuck body 11 with rotation axis parallel to the rotation axis 1, is drivable stepwise in the rotation direction and can be fixed in different rotary positions.

A plurality of clamping surfaces 8, 8.1, 8.2 and 8.3 are located around the circumference of the revolving disk 7.1 with radial spacing from the revolving axis 7.2. These clamping surfaces 8, 8.1, 8.2, and 8.3 are correlated with different rotary positions of the revolving disk 7.1 so that in each rotary position one of the clamping surfaces intersects the axial spacing plane perpendicularly.

The clamping surfaces 8, 8.1, 8.2, and 8.3 are formed on half cylindrical shells 74. in insets 7.3 of the revolving disk 7.1. The cylinder axes for these cylindrical shells are coaxial with the clamping axis 2 for the clamping surface 8, 8.1, 8.2 or 8.3 which is in the clamped position and the cylinder radius is equal to the radius of the clamping circle.

To compensate for unequal weighting a counterweight 17 is provided which is adjustable by rotating the revolving disk 7.1. Moreover the revolving disk 7.1 has a journal 7.4 coaxial to the revolving disk rotation axis 7.2 which drives the counterweight 17 guided slidably in the chuck body 11 in the direction of the axis spacing line over a controlling curve or cam 7.5.

In its positions corresponding to the different rotary positions of the revolving disk 7.1 the counterweight 17 is securable in the chuck body 11, specifically by a hydraulic clamping bushing 18. The revolving disk 7.1 is mounted on both of its sides, specifically inside of the chuck body at the mounting positions 19' and 19" and outside at mounting position 19'" on a supporting arm 20 overlapping the revolving disk 7.1 attached to the chuck body 11.

The guides 10 of both jointly centrally driven clamping clamp jaws 9 are linear guides formed in the usual way whose central axis 12 running in the guide direction 12—12 intersects the axis spacing plane in the center of the axis spacing area 5. Axially guided key rods 21 in the chuck body 11 drive both centrally jointly driven clamp jaws 9. They fit and engage a drive plate 23 which is axially guided on the columns 24 in the chuck body 11.

The drive plate 23 is connected to a drive piston 25 which is connectable by a bolt or worm 26 in a known way in the power operated chuck on a clamping rod running in the hollow lathe spindle 11.7 which is operable by a clamping cylinder provided on the other end of the lathe spindle.

Figure 2:
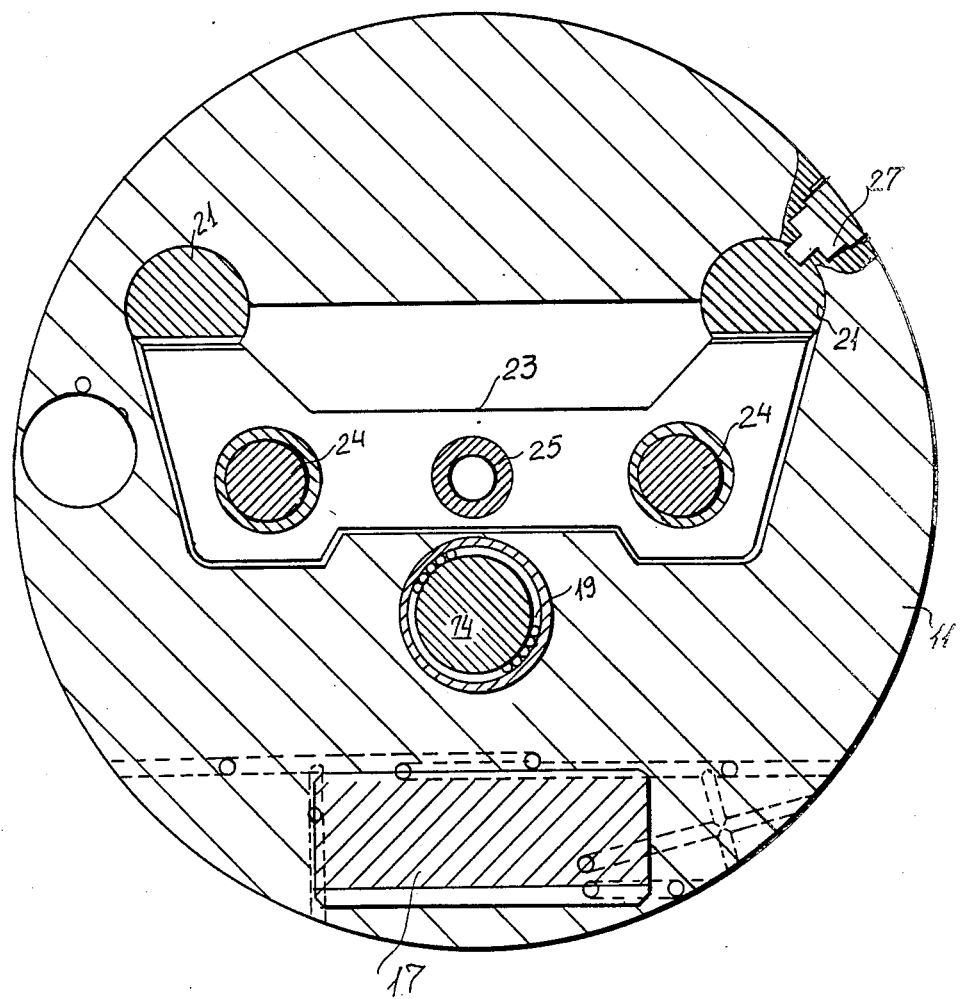
FIG. 2 is a cross sectional view taken along the section line II—II in FIG. 1.

The guided key rods 21 are bolts of substantially circular cross section which are secured to prevent rotation about the key rod axes by bolts 27 (FIG. 2) which engage in longitudinal grooves of the key rods 21.

Furthermore the key rods 21 have key surfaces 21' with which they contact corresponding inclined surfaces of the clamp jaws 9 so that axial adjustment of the key rods provides a corresponding adjustment of the clamping jaws 9 in their guide direction 12—12.

The clamp jaws 9 run in grooves forming the guides 10 and engage with ribs 9.1 in the groove lateral walls in the corresponding passage 10.1.

Figure 5:
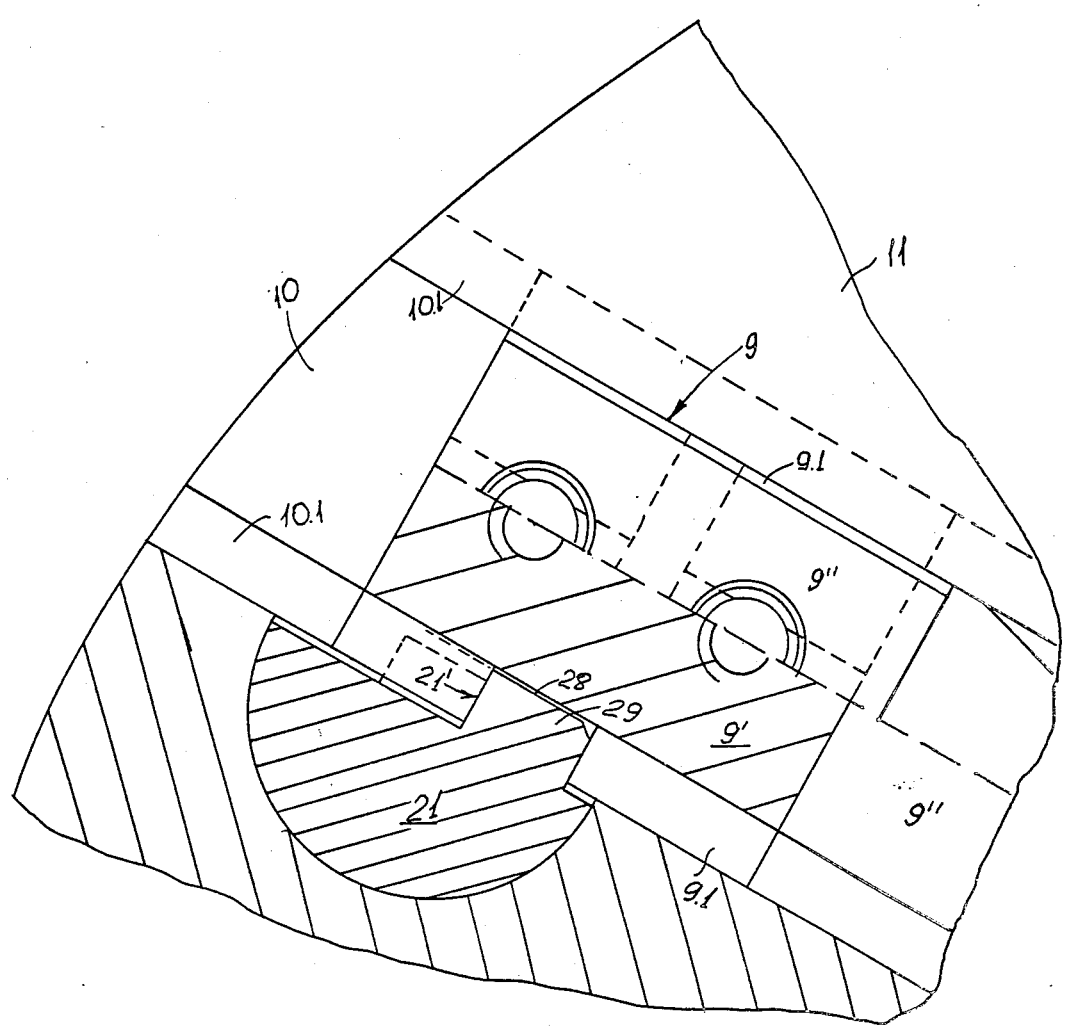
FIG. 5 is a cross sectional view taken along the section line V—V in FIG. 1.

In some cases one of the guide ribs 9.1 has a passage 28 for a shoulder 29 of a key rod 21 and is provided with the inclined surfaces in the passage 28 corresponding to the key surfaces 21' of the key rod 21 contacting it as is apparent particularly from FIG. 5.

Here these clamp jaws 9 have a twin structure, specifically comprising a base member 9' and a seated member 9" mounted replacably on it which is provided with the clamping surfaces 13 of the clamp jaw 9.

The left aligning jaw 15.1 in FIG. 1a is of course adjustable to be able to fit varying workpiece dimensions and is fixed during the usual workpiece change and alignment. The right clamp jaw 15.2 in FIG. 1a is adjustable against it in each workpiece change to fix the workpiece in it easily after alignment of it until it is subsequently clamped by the clamp jaws 9.

Figure 7:
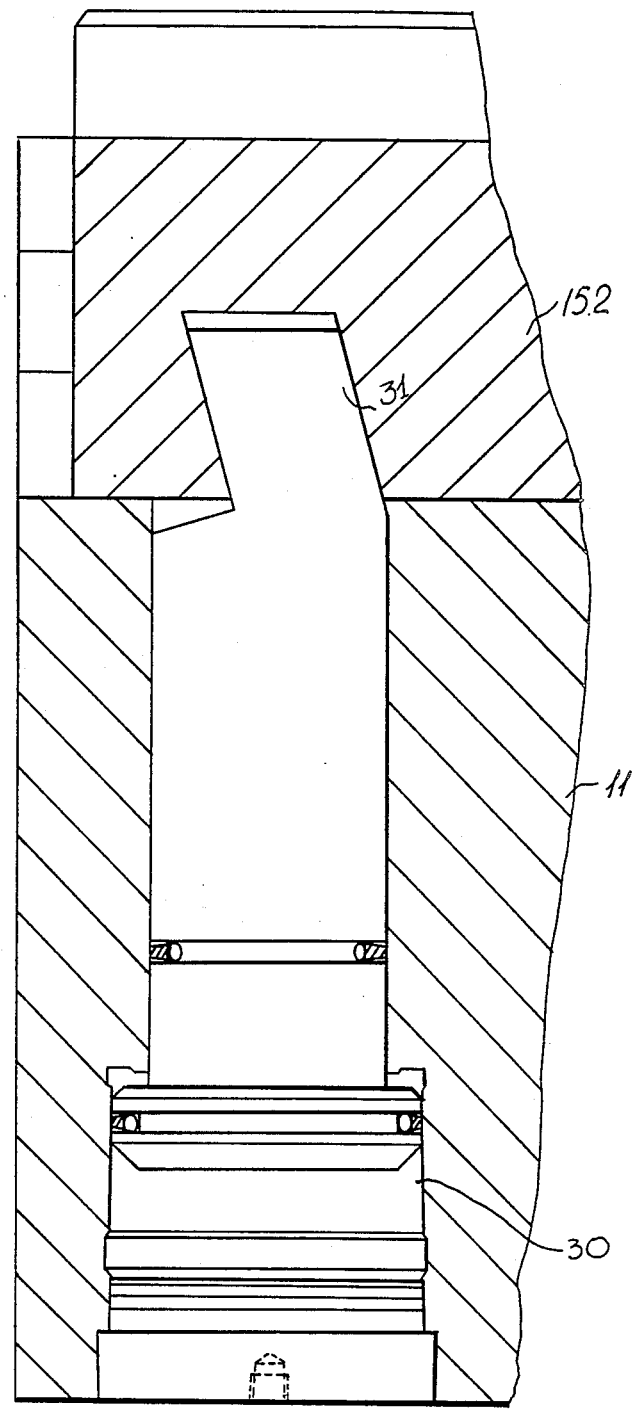

The drive for this aligning jaw 15.2 occurs by its own hydraulic cylinder 30 in the chuck body 11 and by the corresponding key rod 31 according to FIG. 7. Besides the aligning jaws are also assembled from the base member 15' and the replaceable seat member 15".

Figure 6:
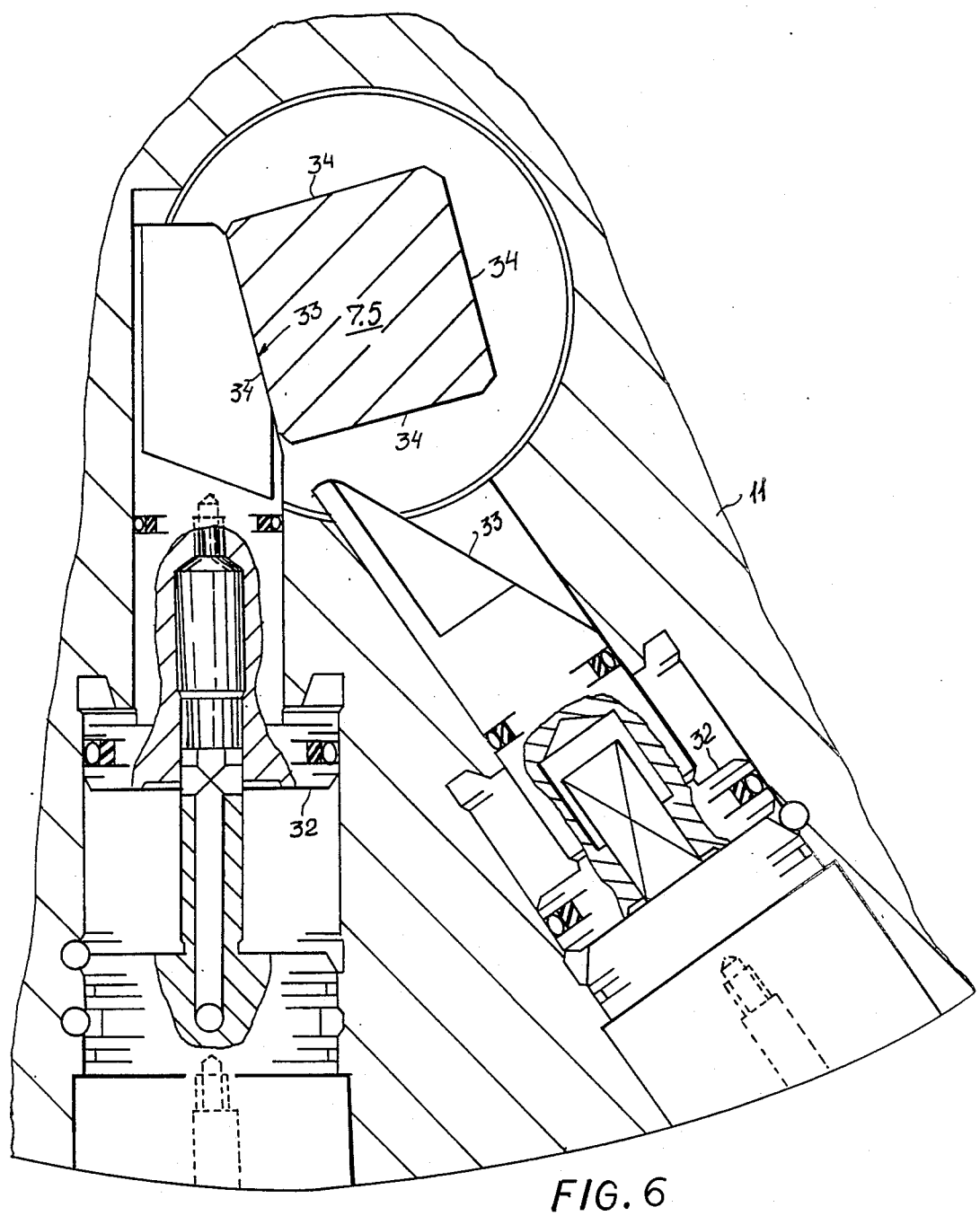
FIG. 6 is a cross sectional view taken along the section line VI—VI in FIG. 1.

The revolving disk 7.1 is adjusted stepwise by two clamping pistons 32 located in the chuck body 11 according to FIG. 6.

Both clamping pistons 32 by inclined surfaces 33 act one after each other on the planar lateral surfaces 34 of a portion of a rectangular cross sectioned segment 7.5 of the revolving disk shaft.

Thus each piston 32 rotates the revolving disk 7.1 approximately 45° further and the left piston 32 vertical in FIG. 6 locks the revolving disk 7.1 in its pushed forward position shown in FIG. 6 after completing a rotation of 90°.

The adjustment of the counterweight 17 occurs simultaneously with rotation of the revolving disk 7.1 in the way already described. The circular cross section pistons 32 are secured by strips or bars 35 (FIG.1) which engage in corresponding grooves of the pistons 32 mounted in the chuck body 11 against rotation about their own axes.

The drawing shows the case in which the clamping axis 2 is nearly at the outer end of the axis spacing area 5. That means that the clamping surface 8 has a large spacing from the revolving disk axis 7.2. The mounting of the crank shaft 3 occurs then practically on the outer end of the clamping surface 13 in the centrally clamping clamp jaws 9 as seen from the clamping surface 8.

The other clamping surfaces 8.1, 8.2 and 8.3 on the revolving disk 7.1 have a smaller spacing from the revolving disk axis 7.2. If the revolving disk 7.1 is rotated in FIG. 1a about for example 180°, so that the clamping surface 8.2 is directed toward the centrally clamping clamping jaws 9, the spacing between the rotating axis 1 and the clamping axis 2 is smaller and the workpiece mounted on the clamping surface 13 is slid correspondingly in to the inner end of the clamping surface.

With the chuck shown also crankshafts with different crank strokes, but with the same clamping diameters, can be machined. To machine crankshafts with other clamping diameters, the seat members 9" of the clamp jaws 9, also the seat members 15" on the aligning jaws 15.1 and 15.2 and finally the clamping insets 7.3 in the revolving disk 7.1 must be replaced.

The device for changing the axis spacing between the rotation axis of the chuck and the clamping axis parallel to it according to my invention comprises the revolving disk with its clamping surfaces and the associated parts required to adjust it.

I claim:

1. In a three-jaw chuck having three clamp jaws for a lathe for clamping a workpiece, particularly a crankshaft, on a clamping axis offset from the rotation axis of said chuck, comprising a device for changing the spacing between said rotation axis and said clamping axis parallel thereto inside an axis spacing area along an axis spacing line extending radially through said rotation axis, one of said clamp jaws with at least one associated clamping surface intersecting the axis spacing plane going through said rotation axis on said axis spacing line and being adjustable so that the position of said clamping surface on said axis spacing line varies, and the other ones of said clamp jaws being positioned slidably and adjustably on each side of said axis spacing plane in two inclined guides positioned symmetrically about said axis spacing plane and being jointly drivable, the improvement wherein said clamp jaw intersecting said axis spacing line with said clamping surface and said jointly drivable other clamp jaws are adjustable independently of each other in and/or on the chuck body of said chuck which is rigidly mounted on the rotating spindle of said lathe so that each of said jointly drivable clamp jaws has a planar clamping surface perpendicular to the guide direction of said clamp jaw and the projection of said axis spacing area perpendicular to the plane of each of said planar clamping surfaces on said planar clamping surfaces is positioned on at least one plane intersecting said clamping surfaces on each of said other jointly drivable clamping jaws perpendicular to said rotation axis.

2. The improvement defined in claim 1 comprising two adjustable aligning jaws positioned opposite each other perpendicular to said axis spacing plane of which one is drivable and each of said aligning jaws has an aligning surface parallel to said axis spacing plane which extends in the direction of said axis spacing line at least over the length of said axis spacing area.

3. The improvement defined in claim 1 wherein said clamp jaw intersecting said axis spacing plane with at least one of said clamping surfaces is a revolving disk which is rotatably mounted with said revolving disk axis parallel to said rotation axis in said chuck body, is drivable stepwise in the rotation direction and is fixable at any one of a plurality of rotary positions so that a plurality of said clamping surfaces are positionable around the circumference of said revolving disk with radial spacing for said revolving disk axis and each of said clamping surfaces is located at one of said rotary positions of said revolving disk so that said clamping surface intersects said axis spacing plane in each of said rotary positions.

4. The improvement defined in claim 3 wherein said clamping surfaces are located on a plurality of insets of said revolving disk.

5. The improvement defined in claim 3 wherein said clamping surface and/or said clamping surfaces are formed on a plurality of cylindrical shells, particularly cylindrical half shells, with the cylinder axes coaxial to said clamping axis in the clamped position.

6. The improvement defined in claim 3 wherein a counterweight acting to correct an imbalance is adjustable by said revolving disk.

7. The improvement defined in claim 6 wherein said revolving disk has a journal coaxial to said revolving disk axis which drives said counterweight guided on said axis spacing line slidably in said chuck body over a controlling curve which is fixable in a position in said chuck body corresponding to one of said rotary positions of said revolving disk.

8. The improvement defined in claim 7 wherein said revolving disk is supported on both sides and a supporting arm overlapping said revolving disk is provided on said chuck body.

9. The improvement defined in claim 1 wherein said guides of said jointly driven clamp jaws are each linear guides whose central axes running in said guide direction intersect in said axis spacing plane in the center of said axis spacing area.

10. A three-jaw chuck having three clamp jaws for a lathe for clamping a workpiece, particularly a crankshaft, on a clamping axis offset from to the rotation axis of said chuck, comprising:

a device for changing the spacing between said rotation axis and said clamping axis parallel thereto inside an axis spacing area of said chuck along an axis spacing line extending radially through said rotation axis comprising a revolving disk which is one of said clamp jaws and which is rotatably mounted with said revolving disk axis parallel to said rotation axis in said chuck body, supported on both sides and provided with a supporting arm overlapping said revolving disk in said chuck body, is drivable stepwise in the rotation direction and is fixable at any one of a plurality of rotary positions so that a plurality of clamping surfaces are positionable around the circumference of said revolving disk with different radial spacing from said revolving disk axis and each of said clamping surfaces is located at one of said rotary positions of said revolving disk so that said clamping surface intersects the axis spacing plane in each of said rotary positions so that the position of said clamping surfaces on said axis spacing line varies;

the other ones of said clamp jaws being positioned slidably and adjustably on each side of said axis spacing plane in a plurality of linear guides inclined symmetrically about said axis spacing plane and being jointly drivable, said clamp jaw intersecting said axis spacing line with said clamping surface and both said jointly drivable other clamp jaws being adjustable independently of each other in or on the chuck body of said chuck which is rigidly mounted on the rotating spindle of said lathe so that each of said jointly drivable clamp jaws has a planar clamping surface perpendicular to the guide direction of said clamp jaw and the projection of said axis spacing area perpendicular to the plane of one of said planar clamping surfaces on said one of said clamping surfaces is positioned on at least one plane intersecting said clamping surfaces on each of said other jointly drivable clamping jaws and perpendicular to said rotation axis;

two adjustable aligning jaws positioned opposite each other perpendicular to said axis spacing plane of which one is drivable and each of said aligning jaws has an aligning surface parallel to said axis spacing plane which extends in the direction of said axis spacing line at least over the length of said axis spacing area; and a counterweight acting to correct an imbalance adjustable by said revolving disk which has a journal coaxial to said revolving disk axis which drives said counterweight guided on said axis spacing line slidably in said chuck body over a controlling curve which is fixed in said chuck body in said different rotary positions of said revolving disk.

* * * * *